Figure 1:
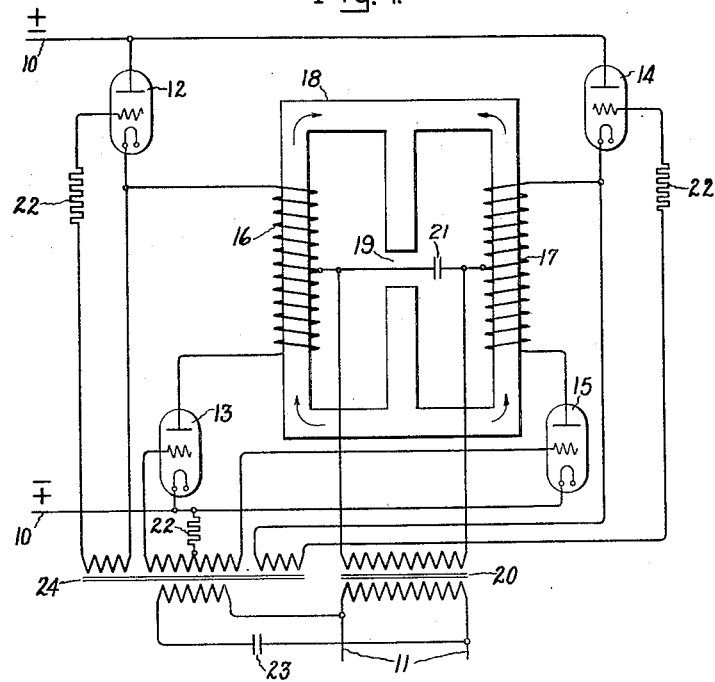

July 18, 1933.    C. A. SABBAH    1,918,870

ELECTRIC VALVE CONVERTING APPARATUS

Filed Sept. 19, 1931

Inventor:
Camil A. Sabbah,
by Charles E. Tullar
His Attorney.

Patented July 18, 1933

1,918,870

UNITED STATES PATENT OFFICE

CAMIL A. SABBAH, OF SCHENECTADY, NEW YORK, ASSIGNOR TO GENERAL ELECTRIC COMPANY, A CORPORATION OF NEW YORK

ELECTRIC VALVE CONVERTING APPARATUS

Application filed September 19, 1931. Serial No. 563,802.

My invention relates to electric valve converting apparatus and more particularly to such apparatus adapted to transmit energy between direct and alternating current circuits.

Heretofore there have been devised numerous power converting apparatus including electric valves for transmitting energy between direct and alternating current circuits. Many of the arrangements of the prior art, however, have been subject to the disadvantage that a failure of any of the several electric valves results in a short circuit on the direct or alternating current circuits. In my copending application, Serial No. 430,735, filed February 24, 1930, there is disclosed and claimed an electric power converting apparatus for transmitting energy between a direct current circuit and a polyphase alternating current circuit in which the deleterious effects of the failure of an electric valve are substantially eliminated by including in the short circuit path across either the direct or alternating current circuit the exciting impedance of a plurality of mutually coupled inductive windings included in series with the several electric valves. It has been found, however, that the arrangement disclosed in that application was not directly applicable to a single phase system.

It is an object of my invention, therefore, to provide an improved electric valve converting apparatus for transmitting energy between a direct current circuit and a single phase alternating current circuit which will overcome the above mentioned disadvantages of the arrangements of the prior art and which will be simple, economical and reliable in operation.

It is another object of my invention to provide an improved electric valve converting apparatus for transmitting energy between a direct current circuit and a single phase alternating current circuit in which short circuits on the alternating or direct current circuits due to the failure of a single electric valve will be substantially eliminated.

In accordance with my invention a direct current circuit and a single phase alternating current circuit are interconnected through two paths each including a pair of electric valves and an inductive winding. The inductive windings are mutually coupled but have a substantial leakage reactance so that any short circuit across the direct current circuit occasioned by the failure of one of the electric valves will be limited by the exciting impedance of the inductive windings and the leakage reactance of one of the windings, while any short circuit on the alternating current circuit occasioned by the failure of an electric valve will be limited by the leakage reactances of the windings in parallel.

Figure 2:
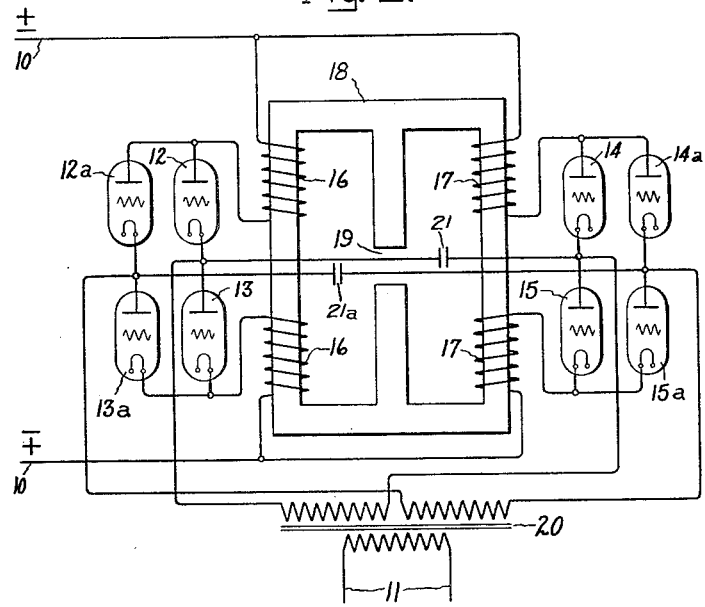

For a better understanding of my invention, together with other and further objects thereof, reference is had to the following description taken in connection with the accompanying drawing and its scope will be pointed out in the appended claims. Fig. 1 of the drawing illustrates a single phase electric valve converting apparatus embodying my invention, while Fig. 2 shows a modification of my invention by means of which two alternating current circuits may be supplied in parallel.

Referring now to Fig. 1 of the drawing, I have illustrated an arrangement for transmitting energy from a direct current circuit 10 to a single phase alternating current circuit 11. This apparatus comprises two pairs of electric valves 12 and 13, and 14 and 15, interconnected through inductive windings 16 and 17, respectively. The windings 16 and 17 are wound on two legs of a three-legged magnetic core member 18, the third leg of which is provided with an air gap 19. The alternating current circuit 11 may be connected directly between electrical midpoints of the windings 16 and 17 or, if desired, a transformer 20 may be interposed therebetween. In case the alternating current circuit 11 is not connected to an independent source of electromotive force for commutating the current between the several electric valves, a commutating capacitor 21 is connected between the electrical midpoints of the windings 16 and 17. Electric valves 12–15, inclusive, are each provided with an anode, a cathode and a control grid and may be of any of the several types well known in the art although I prefer to use valves of the vapor electric discharge type because of the relatively large amounts of power which they can handle at ordinary operating voltages. In order to render the several electric valves successively conductive and non-conductive, their control grids are energized from the secondary windings of a grid transformer 24 through current limiting resistors 22. The primary winding of grid transformer 24 may be energized from any suitable source of alternating potential of the frequency which it is desired to supply to the circuit 11 or, as illustrated, may be energized from the alternating current circuit 11 through a phase advancing condenser 23. With this latter arrangement, the frequency of the current delivered to the circuit 11 will, of course, be determined by that of the alternating current circuit 11, in case it is connected to an independent source of electromotive force; otherwise, the frequency of the current delivered to the circuit 11 will be determined by the constants of the apparatus.

In considering the operation of the above described apparatus, it will be assumed that it is operating as an inverter, transmitting energy from the direct current circuit 10 to the alternating current circuit 11, and that electric valves 12 and 15 are initially made conductive. Under these conditions, current will flow from the positive side of the direct current circuit, through electric valve 12, the upper half of the winding 16, the alternating current circuit 11, the lower half of the winding 17 and electric valve 15 to the other side of the direct current circuit. Under these conditions the flux in the magnetic core member 18 will have the directions indicated by the arrows. Assuming that the alternating current circuit 11 is connected to an independent source of electromotive force so that the condenser 21 may be neglected, electric valves 13 and 14 will be rendered conductive before the electromotive force of the circuit 11 reverses polarity, due to the action of the phase advancing condenser 23 in the grid circuit, as is well understood by those skilled in the art; that is, while the midpoint of the winding 16 is positive with respect to the midpoint of the winding 17. When the valves 14 and 13 are made conductive the current is thus commutated from the valve 12 to the valve 14 and from the valve 15 to the valve 13 and current will flow through the alternating current circuit 11 in the opposite direction for the next successive half cycle. It will be noted that during this interval the current is flowing in the same direction through the windings 16 and 17, merely being transferred from one half of the windings to the other half so that the direction of flux in the magnet core member 18 will remain unchanged. In this manner, the current will be successively commutated between the valves 12 and 15 and the valves 14 and 13 and alternating current will be delivered to the circuit 11.

For an interval after each commutation an inverse potential is impressed across the valves from which current has been transferred; that is, a potential tending to send a current in the reverse direction through these valves. Under the strain of such an inverse potential an electric valve sometimes fails, passing a current in a direction opposite to its normal direction of conductivity and, as stated above, in the majority of the arrangements of the prior art, such a failure of an electric valve causes a short circuit upon the direct current circuit or the alternating current circuit or both. In the above described arrangement, however, such short circuits are substantially eliminated. For example, if it be assumed that electric valves 12 and 15 are conducting current and electric valve 13 fails, due to its inverse potential or any other cause, thus passing current from its cathode to its anode, it will be seen that the alternating current circuit tends to become short circuited through the lower half of the windings 16 and 17 and electric valves 15 and 13. With a current flowing in the reverse direction through the lower half of the winding 16, the magnetomotive force due to this short circuit current thus tends to produce a flux which acts differentially with respect to the leg of the core 18 upon which the winding 16 is wound and the additional current in the lower half of the winding 17 tends to produce a flux which acts cumulatively with respect to the flux in the leg upon which the winding 17 is wound. The result is that these two additional fluxes flow through the two outer legs of the core 18 in series. In other words, the short circuit current is opposed by the magnetizing reactance of the windings 16 and 17 in series. This reactance can easily be so proportioned that the short circuit current on the alternating current circuit can be maintained within any desired limits.

On the other hand, in case one of the valves, for example, valve 13, should fail while its anode potential is positive, due to a failure of the grid action or any other cause, it will be seen that the direct current circuit 10 will tend to be short circuited through the valves 12 and 13 and the winding 16. However, this direct current short circuit current flowing through the winding 16 will tend to increase the flux in this leg of the core 18 and also that in the leg upon which the winding 17 is wound. In other words, the direct current short circuit current will be opposed by the full magnetizing reactance of the winding 16. The value to which this direct current short circuit current will build up in the interval during which the valve 13 has a positive anode potential may be limited to any desired value by a proper selection of circuit constants.

In case the alternating current circuit 11 is not connected to an independent source of electromotive force, it will be understood that the condenser 21 will be charged during successive intervals to such a potential as to be effective to commutate the current between the several electric valves as explained above. In this case the frequency of the alternating current delivered to the circuit 10 will be determined by the various constants of the apparatus, in particular the size of the condenser 23 connected in series with the primary winding of the grid transformer 24.

In case the above described apparatus is operating as a rectifier transmitting energy from the alternating current circuit 11 to the direct current circuit 10, it will, of course, be apparent that the grid control of the several electric valves may be omitted as well as the commutating capacitor 21. However, the apparatus will be effective, as in the case when operating as an inverter, substantially to eliminate short circuit currents on either the direct or alternating current circuit. It has been found, also, that the presence of the leakage path in the magnetic core member serves to make the commutation of the load current between the several electric valves more gradual, thus improving the wave form of the alternating current and reducing strains on the apparatus due to current surges.

Fig. 2 illustrates a modification of my invention in which the two halves of the inductive windings 16 and 17 have been separated and in which the pairs of electric valves 12 and 13, and 14 and 15 have been connected therebetween. By means of this arrangement two pairs of additional electric valves 12a and 13a, and 14a and 15a may be connected in parallel to the first mentioned electric valves to supply an additional winding of the transformer 20 or, in case it is desired, to supply a separate alternating current circuit. The operation of the arrangement described in Fig. 2 is substantially similar to that described above in connection with Fig. 1.

While I have described what I at present consider the preferred embodiment of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States, is,—

1. Apparatus for transmitting energy between direct and alternating current circuits comprising two parallel circuits for connection across said direct current circuit, each of said parallel circuits consisting of a pair of electric valves and an inductive winding and each being provided with an intermediate terminal for connection to said alternating current circuit, a magnetic coupling between said windings, and a low reluctance leakage path in said magnetic coupling.

2. Apparatus for transmitting energy between direct and alternating current circuits comprising two parallel circuits for connection across said direct current circuit, each of said parallel circuits consisting of a pair of electric valves and an inductive winding and being provided with an intermediate terminal for connection to said alternating current circuit, and a magnetic core member provided with a pair of legs for said inductive windings and a third leg having an air gap.

3. Apparatus for transmitting energy from a direct current supply circuit to an alternating current load circuit comprising two parallel circuits for connection across said direct current circuit, each of said parallel circuits consisting of a pair of electric valves and an inductive winding and each being provided with an intermediate terminal for connection to said alternating current circuit, said inductive windings being inductively coupled but having a substantial leakage reactance with respect to each other, a commutating capacitor connected between said terminals and means for controlling the conductivities of said valves.

4. Apparatus for transmitting energy from a direct current supply circuit to an alternating current load circuit comprising two parallel circuits for connection across said direct current circuit, each of said parallel circuits consisting of a pair of electric valves interconnected through an inductive winding, an inductive coupling between said windings, said windings having a substantial leakage reactance with respect to each other and each of said inductive windings being provided with an electrical midpoint for connection to said alternating current circuit, means for periodically rendering said valves alternately conductive and nonconductive, and means for commutating the current between said valves.

5. Apparatus for transmitting energy between direct and alternating current circuits comprising two parallel circuits for connection across said direct current circuit, each of said parallel circuits consisting of a pair of inductive windings connected in series through two pairs of serially connected electric valves, a terminal at the junction of each of said pairs of valves for connection to said alternating current circuit, and an inductive coupling between said windings, said windings having a substantial leakage reactance with respect to each other.

CAMIL A. SABBAH.